(12) United States Patent
Satou et al.

(10) Patent No.: US 10,788,904 B2
(45) Date of Patent: Sep. 29, 2020

(54) IN-VEHICLE INFORMATION PROCESSING SYSTEM

(71) Applicant: CALSONIC KANSEI CORPORATION, Saitama-shi Saitama (JP)

(72) Inventors: Haruhiko Satou, Saitama (JP); Teruo Yoshitomi, Saitama (JP)

(73) Assignee: CALSONIC KANSEI CORPORATION, Saitama-shi, Saitama (JP)

(*) Notice: Subject to any disclaimer, the term of this patent is extended or adjusted under 35 U.S.C. 154(b) by 0 days.

(21) Appl. No.: 16/091,204

(22) PCT Filed: Mar. 30, 2017

(86) PCT No.: PCT/JP2017/013451
§ 371 (c)(1),
(2) Date: Oct. 4, 2018

(87) PCT Pub. No.: WO2017/175666
PCT Pub. Date: Oct. 12, 2017

(65) Prior Publication Data
US 2019/0278392 A1  Sep. 12, 2019

(30) Foreign Application Priority Data

Apr. 5, 2016 (JP) .................................. 2016-076080

(51) Int. Cl.
*G06F 3/0354* (2013.01)
*G06T 7/70* (2017.01)
(Continued)

(52) U.S. Cl.
CPC .......... *G06F 3/03547* (2013.01); *B60R 16/02* (2013.01); *G06F 3/011* (2013.01);
(Continued)

(58) Field of Classification Search
CPC .................. G01C 21/3664; G06T 7/70; G06T 2207/30196; G06F 3/0482; G06F 3/04886;
(Continued)

(56) References Cited

U.S. PATENT DOCUMENTS

2009/0167682 A1* 7/2009 Yamashita ............. G01C 21/36
345/158
2009/0195659 A1* 8/2009 Nagata .................. G06F 3/0425
348/207.1
(Continued)

FOREIGN PATENT DOCUMENTS

JP  2008217548 A  9/2008
JP  2009122720 A  6/2009
(Continued)

OTHER PUBLICATIONS

Oct. 11, 2018, International Preliminary Report on Patentability issued in the International Patent Application No. PCT/JP2017/013451.
(Continued)

*Primary Examiner* — Charles V Hicks
(74) *Attorney, Agent, or Firm* — Kenja IP Law PC

(57) ABSTRACT

Provided is an in-vehicle information processing system that can be operated intuitively. An in-vehicle information processing system (10) includes a display (11), a touch operation interface (12), an imaging unit (13), and a controller (14). The display (11) includes at least one screen. The touch operation interface (12) detects contact by an operation hand of an operator. The imaging unit (13) captures an image of the touch operation interface (12) and at least a portion of the operation hand. The controller (14) associates position coordinates in an operation region (R2) on the screen with position coordinates in a predetermined region (R1) of the touch operation interface (12) and causes at least a portion
(Continued)

of the operation hand to be displayed in overlap on the screen on the basis of the image captured by the imaging unit (13).

9 Claims, 9 Drawing Sheets

(51) Int. Cl.
  *G06F 3/01*    (2006.01)
  *G06F 3/02*    (2006.01)
  *G06F 3/0482*   (2013.01)
  *G06F 3/0488*   (2013.01)
  *B60R 16/02*   (2006.01)
  *G06F 3/0481*   (2013.01)
  *B60K 35/00*   (2006.01)
  *G01C 21/36*   (2006.01)

(52) U.S. Cl.
  CPC .............. *G06F 3/02* (2013.01); *G06F 3/0481* (2013.01); *G06F 3/0482* (2013.01); *G06F 3/0488* (2013.01); *G06F 3/04886* (2013.01); *G06T 7/70* (2017.01); *B60K 35/00* (2013.01); *B60K 2370/1438* (2019.05); *G01C 21/3664* (2013.01); *G06F 2203/04804* (2013.01); *G06T 2207/30196* (2013.01)

(58) Field of Classification Search
  CPC ....... G06F 3/03547; G06F 2203/04804; G06F 3/02; G06F 3/011; B60K 2370/1438; B60K 5/00
  See application file for complete search history.

(56) References Cited

U.S. PATENT DOCUMENTS

| | | | |
|---|---|---|---|
| 2010/0073404 A1* | 3/2010 | Brown | ................ G06F 3/04895 345/634 |
| 2010/0220053 A1 | 9/2010 | Ishii | |
| 2017/0068338 A1 | 3/2017 | Hatanaka et al. | |

FOREIGN PATENT DOCUMENTS

| | | |
|---|---|---|
| JP | 2009301094 A | 12/2009 |
| JP | 2010201942 A | 9/2010 |
| JP | 2013061848 A | 4/2013 |
| JP | 2015174648 A | 10/2015 |
| JP | 2016012313 A | 1/2016 |
| WO | 2007088942 A1 | 8/2007 |

OTHER PUBLICATIONS

May 9, 2017, International Search Report issued in the International Patent Application No. PCT/JP2017/013451.

May 12, 2020, Notification of Reasons for Refusal issued by the Japan Patent Office in the corresponding Japanese Patent Application No. 2016-076080 with English language Concise Explanation.

\* cited by examiner

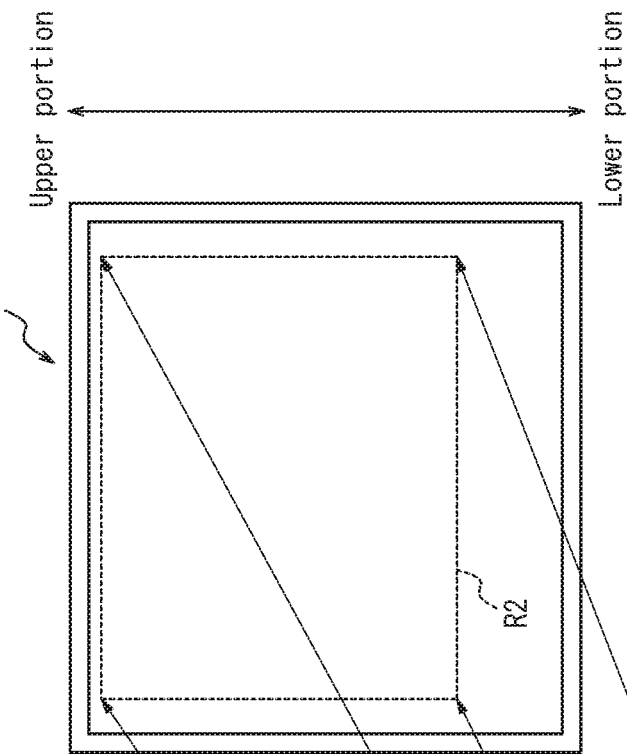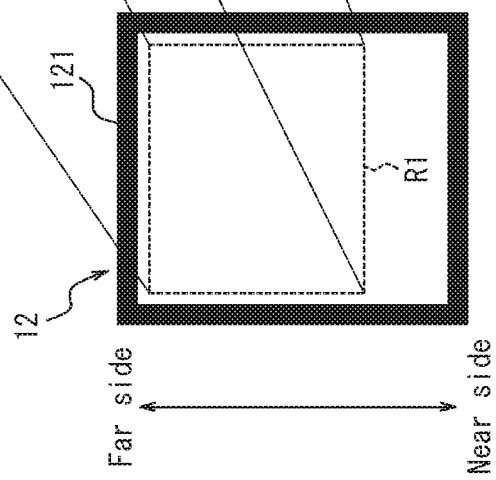

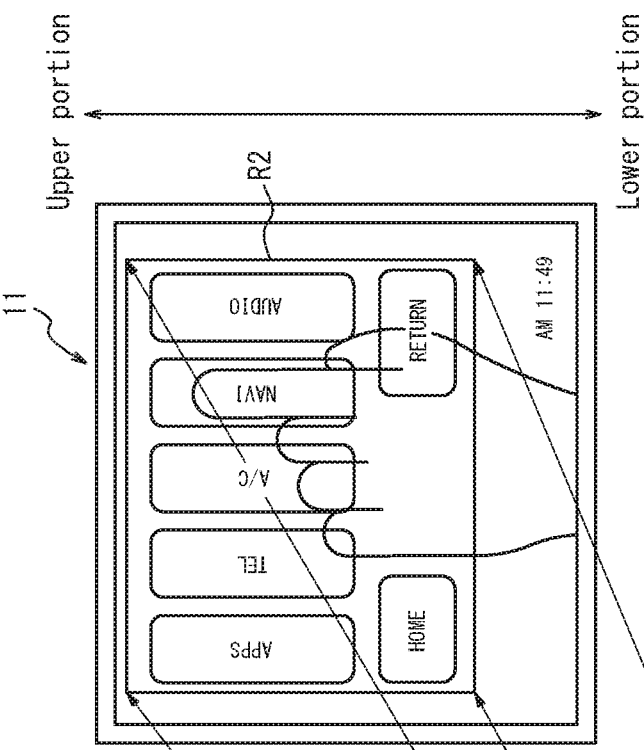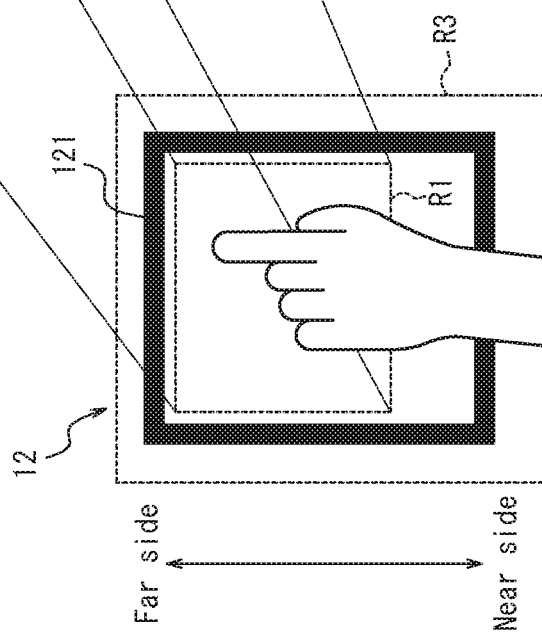

IN-VEHICLE INFORMATION PROCESSING SYSTEM

CROSS-REFERENCE TO RELATED APPLICATION

The present application claims priority to and the benefit of Japanese Patent Application No. 2016-076080 filed Apr. 5, 2016, the entire contents of which are incorporated herein by reference.

TECHNICAL FIELD

The present disclosure relates to an in-vehicle information processing system mounted in a vehicle to control information related to the vehicle.

BACKGROUND

Techniques exist for an operator to control a pointer or a cursor displayed on a screen, to scroll the screen, to make selections, to provide input, and the like by touching a touchpad installed in a center console.

For example, the operation input apparatus disclosed in patent literature (PTL) 1 can reduce the effect of external factors, including vibration while the vehicle is running, to allow smooth movement of the cursor on a display on the basis of a touch on the touchpad.

The operation apparatus disclosed in PTL 2, for example, allows operation of the pointer or cursor displayed on the screen and scrolling of the screen in response to the operator touching the touchpad installed in the center console.

CITATION LIST

Patent Literature

PTL 1: JP2015174648A
PTL 2: JP2016012313A

SUMMARY

Technical Problem

The apparatuses disclosed in PTL 1 and 2 respond to operation by the operator by rendering a pointer, a cursor, a movement vector, or the like on the screen. Such operation is not intuitive. Furthermore, the operator spends a long time looking closely at the pointer or the like on the screen, since the correspondence relationship between the position of the operation hand and the position of the pointer or the like on the screen is not clear. An interface that can be operated more intuitively is therefore desired.

In light of these considerations, the present disclosure aims to provide an in-vehicle information processing system that can be operated intuitively.

Solution to Problem

To resolve the aforementioned problem, an in-vehicle information processing system according to an embodiment of the present disclosure includes:

a display including at least one screen;
a touch operation interface configured to detect contact by an operation hand of an operator;
an imaging unit configured to capture an image of the touch operation interface and at least a portion of the operation hand; and
a controller configured to associate position coordinates in an operation region on the screen with position coordinates in a predetermined region of the touch operation interface and to cause at least a portion of the operation hand to be displayed in overlap on the screen on the basis of the image captured by the imaging unit.

Advantageous Effect

The in-vehicle information processing system according to an embodiment of the present disclosure can be operated intuitively.

BRIEF DESCRIPTION OF THE DRAWINGS

In the accompanying drawings:

FIGS. 5A and 5B schematically illustrate an example of the correspondence relationship between a predetermined region of the touch operation interface and an operation region on a screen of the display;

FIGS. 6A and 6B are schematic diagrams illustrating image processing performed by the in-vehicle information processing system;

DETAILED DESCRIPTION

Embodiments of the present disclosure are described in detail with reference to the drawings.

Figure 1:
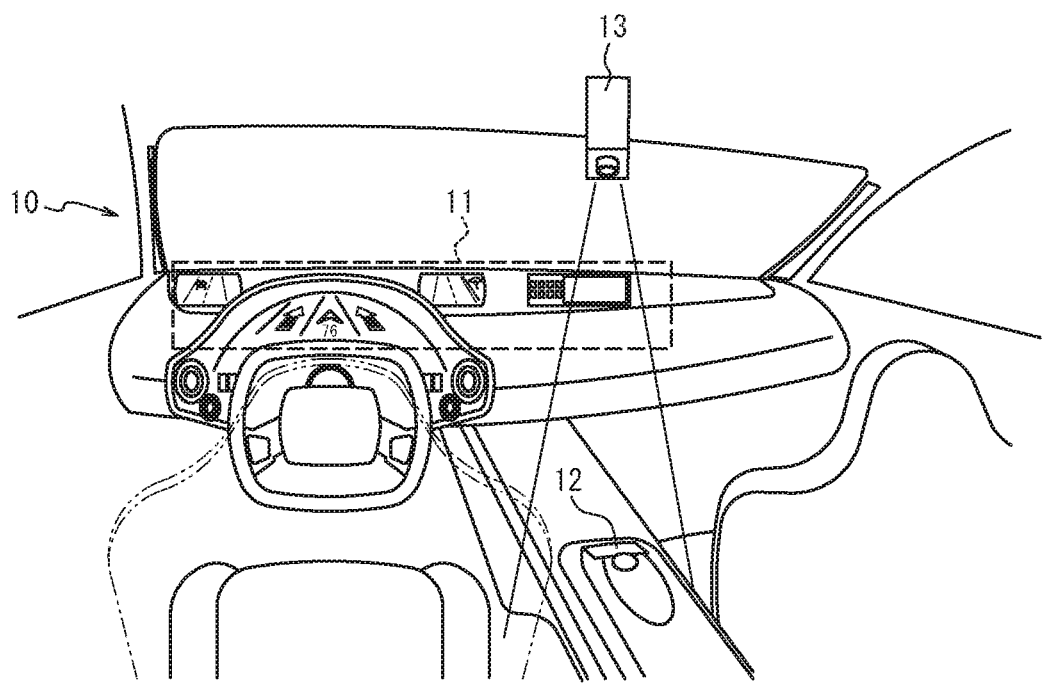
FIG. 1 is an overview of an in-vehicle information processing system according to an embodiment.
Figure 2:
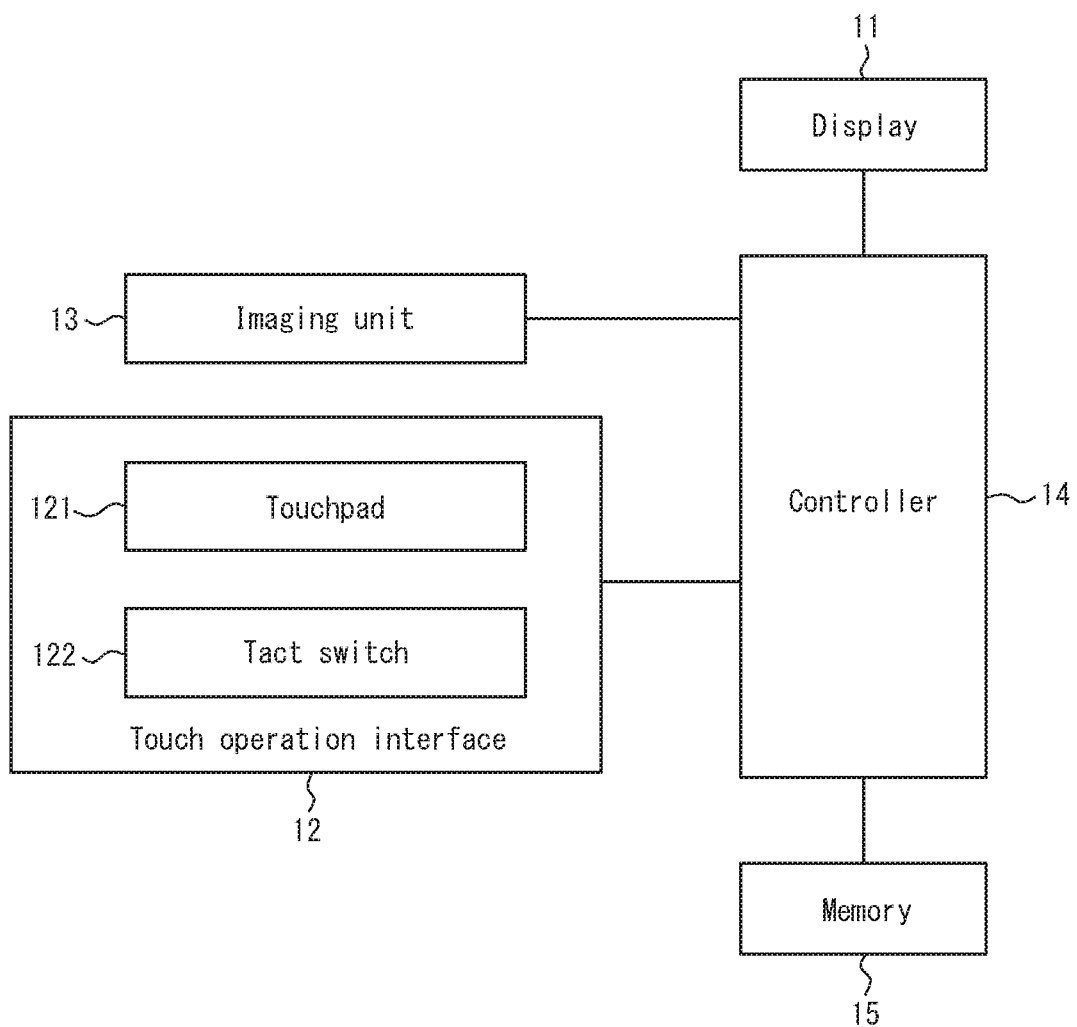
FIG. 2 is a functional block diagram illustrating the schematic configuration of the in-vehicle information processing system of FIG. 1.
Figure 3A:
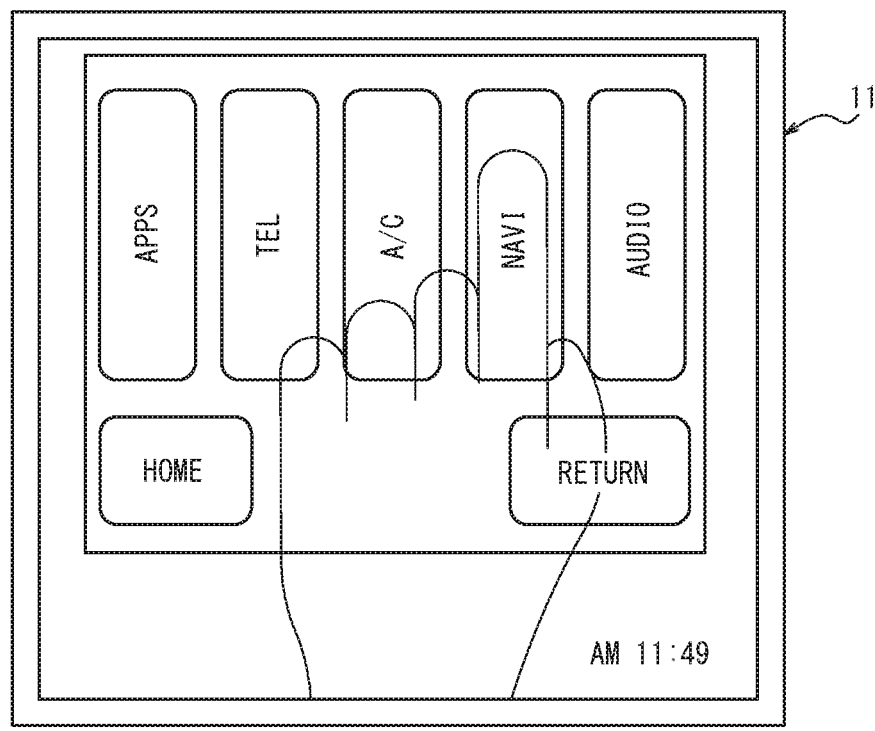
FIGS. 3A and 3B are schematic diagrams illustrating examples of images displayed on a display.
Figure 3B:
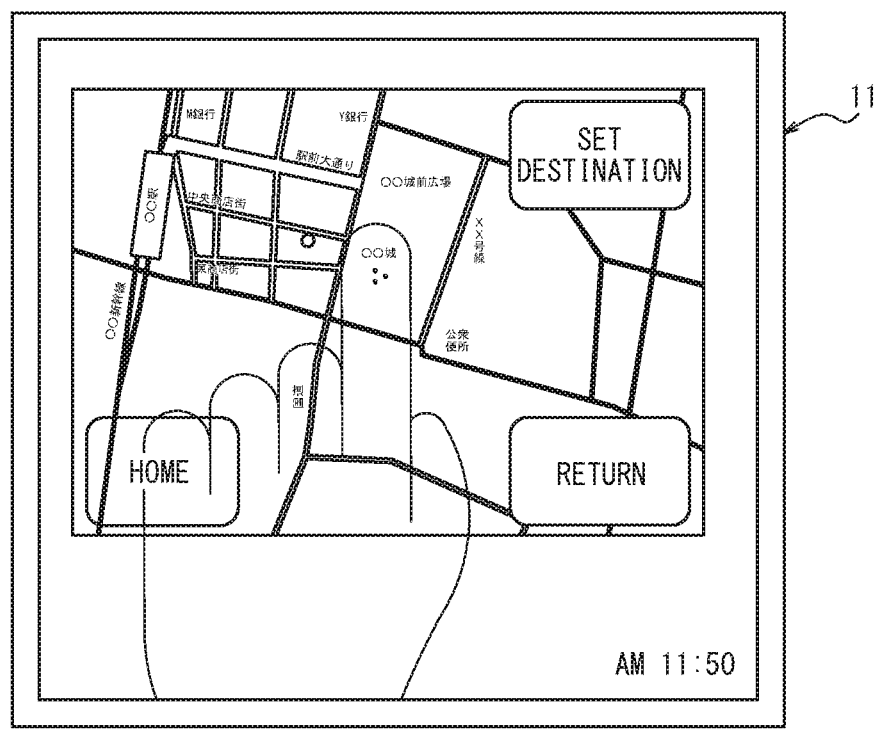
Figure 4:
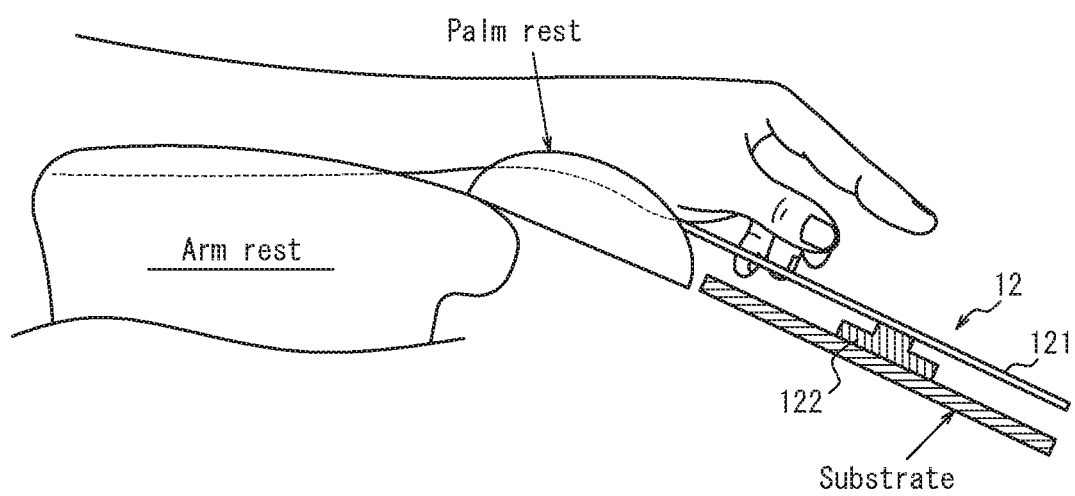
FIG. 4 schematically illustrates a cross-section when viewing a touch operation interface from the side.

FIG. 1 is an overview of an in-vehicle information processing system 10 according to the present embodiment. FIG. 2 is a functional block diagram illustrating the schematic configuration of the in-vehicle information processing system 10 of FIG. 1. The in-vehicle information processing system 10 includes a display 11, a touch operation interface 12, an imaging unit 13, a controller 14, and a memory 15. FIGS. 3A and 3B are schematic diagrams illustrating examples of images displayed on the display 11. FIG. 3A illustrates an example of a menu screen, and FIG. 3B illustrates an example of a map screen. FIG. 4 schematically illustrates a cross-section when viewing the touch operation interface 12 from the side.

The in-vehicle information processing system 10 associates position coordinates in an operation region on a screen of the display 11 with position coordinates in a predetermined region of the touch operation interface 12 and displays the operator's operation hand in overlap on the screen on the basis of an image captured by the imaging unit 13. In other words, the operation hand displayed in overlap on the screen virtually operates the screen at the corresponding position on the basis of a touch operation by the operator on the touch operation interface 12. The in-vehicle information processing system 10 associates movement of the operation hand displayed in overlap on the screen with actual movement of the operator's operation hand captured by the imaging unit 13. The operator is, for example, the driver of the vehicle or a passenger in the passenger seat. The operation hand is, for example, the driver's or passenger's hand closer to the center console.

As illustrated in FIG. 1, the display 11 includes at least one screen. The display 11 may be constituted by any display apparatus, such as a liquid crystal display. When constituted by a liquid crystal display, the display 11 is arranged on the instrument panel, for example. The display apparatus constituting the display 11 may be a touch panel display or a display not supporting touch operation. The display 11 is described below as being a display not supporting touch operation.

In addition to or instead of the display 11, the in-vehicle information processing system 10 may include a head-up display apparatus. In this case, the head-up display apparatus includes an optical emitter for emitting display information as display light and displays a virtual image beyond the front windshield by reflecting the emitted display light towards an observer, such as the driver. The observer is not limited to the driver and may, for example, be a passenger in the passenger seat.

The display 11 displays information related to the vehicle, functional items for controlling the information, or a combination thereof. These are collectively referred to below as the "display content". The information related to the vehicle includes, for example, information on the air-conditioning, the car navigation, the audio, a surrounding image of the vehicle from an electronic mirror, the vehicle speed, the position of the vehicle among multiple lanes, the distance between vehicles, and the like. The functional items for controlling the information include items such as "back", "next", "home", "OK", "menus", "raise/lower temperature", "current location", "raise/lower volume", "zoom in/out", "accelerate/decelerate", "change lanes", and "increase/decrease distance". The display 11 may display each item with characters or as an icon.

For example, as illustrated in FIG. 3A, the display 11 displays menus as the functional items for controlling the information related to the vehicle. Specifically, the display 11 displays "APPS" as an item for displaying applications. The display 11 displays "TEL" as an item for using the telephone. The display 11 displays "A/C" as an item for controlling the air-conditioning. The display 11 displays "NAVI" as a menu for using the car navigation. The display 11 displays "AUDIO" as a menu for using the audio. The display 11 displays "HOME" as an item for returning to the home screen. The display 11 displays "RETURN" as an item for returning to the previous screen.

For example, as illustrated in FIG. 3B, the display 11 displays map information as the information related to the vehicle. The map information is a portion of the car navigation system. The display 11 displays functional items such as "SET DESTINATION", "HOME" and "RETURN" in overlap on the map information as a combination of information related to the vehicle and functional items for controlling the information.

The display 11 displays the operator's operation hand in overlap on the display content. As illustrated in FIGS. 3A and 3B, the display 11 makes the operator's operation hand translucent and displays the display content behind the operation hand. The display 11 is not limited to this configuration and may make the displayed operation hand opaque to temporarily hide the display content overlapped by the operator's operation hand.

The degree of translucency, i.e. the transmittance, is described below as being constant regardless of the position of overlap, but this configuration is not limiting. The transmittance may change depending on the position of overlap. For example, at the position where the functional items are displayed, the display 11 may display the operator's operation hand after increasing the transmittance above a predetermined value, so that the item to be selected is sufficiently visible to the operator. Conversely, at a position where only the background is displayed, the display 11 may display the operator's operation hand after lowering the transmittance below a predetermined value.

The display 11 may display the operator's operation hand with gradation applied thereto. The gradation referred to here may include any incremental change in brightness, color, transmittance, or a combination thereof. The display 11 preferably applies gradation with a method that makes the display content behind the operation hand highly visible to the operator. For example, with increased proximity to the fingertips of the operator's operation hand displayed in overlap, the display 11 may gradually increase the brightness, gradually change to a pale color, or gradually increase the transmittance of the operation hand.

As the transmittance is lower, the operator's operation hand in overlap appears more realistic, but the display content behind the operation hand becomes less visible to the operator. Conversely, as the transmittance is higher, the display content becomes more visible to the operator, but the operation hand appears less realistic. The display 11 therefore preferably uses a display method that displays the operator's operation hand realistically in overlap with the display content while making the display content highly visible to the operator.

The display 11 has been described as displaying the operator's actual operation hand in overlap in a virtual space where the above-described display content and the like are displayed, but this configuration is not limiting. For example, the display 11 may display the display content and the like in overlap from the front of the operator's operation hand displayed on the screen, as with mixed reality.

As illustrated in FIG. 1, the touch operation interface 12 is arranged in the center console, for example. As illustrated in FIG. 2, the touch operation interface 12 includes a touchpad 121 and a tact switch 122. As illustrated in FIG. 4, the operator places his arm on an armrest and his wrist on a palm rest, with a finger or other such portion of the operation hand in contact with the touchpad 121.

The touchpad 121 detects contact, at a corresponding contact position, by a contacting object such as the operator's operation hand or a stylus. The touchpad 121 detects contact, at a corresponding contact position, by a portion of the operator's operation hand, such as a finger. The operator manipulates the information displayed on each screen of the display 11 by performing a touch operation on the touch operation interface 12, in particular on the touchpad 121. The touchpad 121 is, for example, formed from transparent glass and may use a touch sensor that employs any method, such as a resistive film method, a capacitance method, a surface acoustic wave method, an infrared method, or an electromagnetic induction method. The touchpad 121 is described below as being an electrostatic touchpad that uses a capacitance method.

As illustrated in FIG. 4, the tact switch 122 is arranged directly below the touchpad 121 and is supported by a substrate. When the touchpad 121 is displaced downward by being pushed by the operator, the tact switch 122 turns on in response to the press. The tact switch 122 turns off when the operator stops pushing and the touchpad 121 returns to its original position. The operator feels a click sensation when the tact switch 122 turns on in response to pushing of the touchpad 121.

In FIG. 4, one tact switch 122 is arranged directly below the central portion of the touchpad 121, but this configuration is not limiting. Any number of tact switches 122 may be arranged at any locations provided that a pressing force from the touchpad 121 can be detected. For example, one tact switch 122 may be arranged in the peripheral area directly below the touchpad 121, or a plurality of tact switches 122 may be scattered over a plurality of positions. A plurality of tact switches 122 arranged directly below the touchpad 121 allows the touch operation interface 12 to detect a pressing force from the touchpad 121 in each of a plurality of predetermined areas of the touchpad 121, for example. In other words, the touch operation interface 12 may be configured to allow detection of the positions on the touchpad 121 pushed by the operator when a plurality of the operator's fingers are simultaneously in contact with the touchpad 121.

The component arranged directly below the touchpad 121 is not limited to the tact switch 122 and may be any component capable of detecting a pressing force from the touchpad 121. For example, a pressure sensor such as a piezoelectric element may be arranged directly below the touchpad 121 instead of the tact switch 122.

In addition to the touchpad 121 and the tact switch 122, the touch operation interface 12 may include a filter for removing an unwanted detection signal of the touchpad 121 caused by vibration while the vehicle is running.

The imaging unit 13 includes at least one camera and is located in the roof panel, for example. The camera of the imaging unit 13 is arranged to capture an image of the inside of the vehicle from the roof panel. In greater detail, the imaging unit 13 captures, from above, an image of the touch operation interface 12 and at least a portion of the operator's operation hand that performs a touch operation on the touch operation interface 12.

The imaging unit 13 may capture an image of at least a portion of the operator's operation hand, such as only the five fingers, but preferably captures an image of all of the operation hand including the back of the hand and the like. All of the operation hand refers to the body part from near the operator's wrist to the fingertips. In this case, the imaging unit 13 is preferably located above the operation hand, for example in the roof panel, to capture an image of all of the operator's operation hand easily.

The imaging unit 13 is not limited to this configuration and may be arranged at any location that allows an image of at least a portion of the operator's operation hand to be captured. For example, the touchpad 121 may be transparent, and the imaging unit 13 may be arranged directly below the touchpad 121 to capture, from below, an image of a portion of the operator's operation hand that performs a touch operation on the touchpad 121. In this case, the palm rest portion in FIG. 4 may be changed to any transparent support member, for example, for the imaging unit 13 to be capable of capturing an image of all of the operator's operation hand, including the back of the hand and the like.

The imaging unit 13 preferably includes a camera with a wide dynamic range to allow a sharp image of the operator's operation hand to be captured both in bright conditions during the day and dark conditions at night. The image captured by the camera may be black and white or color.

The imaging unit 13 is not limited to being a camera with a wide dynamic range and may be formed by a camera capable of capturing images in bright conditions during the day. In this case, the imaging unit 13 may irradiate the operator's operation hand on the touchpad 121 from above with a spotlight to capture a sharp image of the operator's operation hand at night.

When the vehicle is driving autonomously, it is assumed that the operator may recline the seat and relax while stretched out on the seat. If the position of the touch operation interface 12 is fixed at this time, the operator needs to extend his arm and perform a touch operation while stretched out on the seat, which is inconvenient. The center console where the touch operation interface 12 is located can therefore be configured to move back in conjunction with movement of the reclining seat, so that the operator can easily perform a touch operation without extending his arm. This configuration requires that the imaging unit 13 capture an image of the operation hand on the touchpad 121 in accordance with the various positions of the touch operation interface 12 that moves in conjunction with the reclining seat.

The imaging unit 13 is therefore preferably constituted by a camera that has a wide field of view in addition to the aforementioned configuration. However, this example is not limiting. The imaging unit 13 may be a camera that has a narrow field of view but is configured so that the angle of the camera itself changes in conjunction with a change in position of the touch operation interface 12. Similarly, the imaging unit 13 may be configured so that the camera itself moves in parallel in conjunction with a change in position of the touch operation interface 12. The position of the touch operation interface 12 that changes in conjunction with movement of the reclining seat may, for example, be limited to two positions: one for manual driving, and another for autonomous driving. Two cameras may then be arranged in correspondence with these positions.

The controller 14 is a processor for controlling and managing the entire in-vehicle information processing system 10, including the functional blocks of the in-vehicle information processing system 10. The controller 14 is a processor, such as a central processing unit (CPU), that executes programs with prescribed control procedures. The programs are, for example, stored in the memory 15.

The controller 14 acquires the contact information, detected on the touchpad 121, as an input signal from the touch operation interface 12. Specifically, the controller 14 acquires detection information related to contact by the contacting object, such as the operator's finger, and the corresponding contact position. On the basis of the detection information related to the corresponding contact position, the controller 14 identifies the accurate position coordinates on the touchpad 121 where the touch operation was performed.

The controller 14 acquires, from the touch operation interface 12, a signal related to the on or off state of the tact switch 122. Specifically, when the operator has pushed the tact switch 122 via the touchpad 121, the controller 14 acquires a signal indicating the on state. When the operator has stopped pushing the touchpad 121 to release the tact switch 122, the controller 14 acquires a signal indicating the off state. On the basis of the acquired signal, the controller 14 identifies the on state or off state of the tact switch 122.

When the touchpad 121 detects contact by a portion of the operator's operation hand, the controller 14 selects the corresponding item on the screen of the display 11. At this time, the controller 14 causes the item to be highlighted. Highlighting refers to displaying a predetermined item with emphasis. This highlighting serves as feedback from the controller 14 to the operator indicating that the item is selected. For example, when contact by the operator's finger is detected at the corresponding position of the touchpad 121 as illustrated in FIG. 3A, the controller 14 causes the functional item "NAVI" on the screen to be highlighted. At this time, the controller 14 causes the operator's operation hand to be displayed in overlap at the corresponding position on the basis of the image captured by the imaging unit 13.

The controller 14 finalizes selection of a predetermined item on the screen when the tact switch 122 turns on by being pushed by the touchpad 121 operated by a portion of the operator's operation hand. The operation to finalize selection of a predetermined item on the screen is not limited to this example and may be any operation, such as a double tap on the touchpad 121. In this case, the touch operation interface 12 need not include the tact switch 122.

For example, in FIG. 3A, the controller 14 finalizes selection of the item "NAVI" on the screen when the tact switch 122 turns on by being pushed by a portion of the operator's operation hand. In accordance with a push, a double tap, or the like by a portion of the operator's operation hand in contact with the touchpad 121, such as the index finger, the controller 14 causes a similar movement to be displayed on the screen at this time.

The controller 14 causes the display 11 to display information related to the vehicle, functional items for controlling the information, or a combination thereof. Through the below-described image processing, the controller 14 causes at least a portion of the operator's operation hand to be displayed in overlap on the screen at a display magnification based on the size of the operation region on the screen of the display 11.

The controller 14 refers to various information stored in the memory 15. Specifically, the controller 14 refers to the information related to the vehicle or to information related to the functional items for controlling the information. The controller 14 refers to information related to the on or off state of the tact switch 122. The controller 14 refers to information on an image captured by the imaging unit 13. The controller 14 refers to information related to the operator's operation hand, subjected to image processing, that the display 11 is ultimately caused to display in overlap.

The memory 15 can be a semiconductor memory, a magnetic memory, or the like and stores the above-described types of information, programs for the in-vehicle information processing system 10 to operate, and the like. The memory 15 may also function as a working memory. For example, the memory 15 stores information such as information related to the operator's operation hand, subjected to image processing, that the display 11 is ultimately caused to display in overlap.

The image processing performed by the in-vehicle information processing system 10 is described below in detail with reference to FIGS. 5A and 5B and FIGS. 6A and 6B.

FIGS. 5A and 5B schematically illustrate an example of the correspondence relationship between a predetermined region of the touch operation interface 12 and an operation region on a screen of the display 11. FIG. 5A illustrates a predetermined region R1 of the touch operation interface 12. FIG. 5B illustrates an operation region R2 on a screen of the display 11.

The controller 14 sets the predetermined region R1 of the touch operation interface 12 and the operation region R2 on the screen of the display 11. The predetermined region R1 of the touch operation interface 12 is a region for performance of a touch operation by a portion of the operator's operation hand. For example, the predetermined region R1 of the touch operation interface 12 is a portion or all of the touchpad 121. The operation region R2 on the screen of the display 11 is a region on the display that can be operated virtually by the operator's operation hand displayed in overlap on the screen. For example, the operation region R2 on the screen of the display 11 is a portion or all of the screen.

As illustrated in FIG. 5A, the predetermined region R1 of the touch operation interface 12 is preferably set at the far side of the touch operation interface 12 so that the operator's operation hand overlaps the entire touch operation interface 12. The far side of the touch operation interface 12 is, for example, the far side of the touchpad 121 forming part of the touch operation interface 12. In other words, as illustrated in FIG. 4 and FIG. 5A, the far side of the touch operation interface 12 is the region of the touchpad 121 farthest from the wrist when the operator's arm is on the armrest and the wrist is on the palm rest.

The predetermined region R1 of the touch operation interface 12 is not limited to this configuration and may, as described above, be any partial region on the touchpad 121 or the entire touchpad 121. When the predetermined region R1 of the touch operation interface 12 is a partial region on the touchpad 121, the region on the touchpad 121 other than the predetermined region R1 may be configured not to respond to a touch operation.

When the predetermined region R1 is set at the far side of the touchpad 121, the operation region R2 on the screen of the display 11 is correspondingly set in the upper portion of the screen. In other words, the far side of the touchpad 121 corresponds to the upper portion of the screen, and the near side to the lower portion. This is the most intuitive type of correspondence between the touchpad 121 and the screen of the display 11, but the correspondence relationship is not limited to this case. For example, the above correspondence relationship may be reversed, so that the near side of the touchpad 121 corresponds to the upper portion of the screen, and the far side to the lower portion. In this case, the operation region R2 on the screen of the display 11 may be set at the lower portion of the screen in correspondence with the predetermined region R1 at the far side of the touch operation interface 12 to overlap the operator's operation hand on the entire touch operation interface 12.

The controller 14 associates position coordinates in the set predetermined region R1 of the touch operation interface 12 with position coordinates in the set operation region R2 on the screen of the display 11. For example, consider the case of the predetermined region R1 of the touch operation interface 12 being a rectangular region encompassing a portion or all of the touchpad 121, and the operation region R2 on the screen being a rectangular region encompassing a portion or all of the screen. In this case, the controller 14 associates the four vertices of the predetermined region R1 with the four vertices of the operation region R2. By identifying the correspondence relationship between the position coordinates of the four vertices, the controller 14 can determine the correspondence relationship between points within the rectangular regions defined by the four vertices.

This processing may, for example, be executed as calibration when the in-vehicle information processing system 10 is initially installed in the vehicle or may be executed at any other time.

FIGS. 6A and 6B are schematic diagrams illustrating image processing performed by the in-vehicle information processing system 10. FIG. 6A illustrates the operator's operation hand performing a touch operation on the touch operation interface 12. FIG. 6B illustrates the operator's operation hand displayed in overlap on the screen of the display 11.

The controller 14 acquires information on an image captured by the camera from the imaging unit 13. As illustrated by region R3 in FIG. 6A, the captured image includes (i) at least a portion of the operator's operation hand performing a touch operation on the touch operation interface 12 and (ii) the touch operation interface 12, in particular the touchpad 121. In other words, the imaging unit 13 captures an image of the positional relationship between the touch operation interface 12 and the operator's operation hand. As described above, the controller 14 also associates the position coordinates in the predetermined region R1 with the position coordinates in the operation region R2. The controller 14 can therefore cause at least a portion of the operator's operation hand to be displayed in overlap on the screen in correspondence with the position of the operation hand on the touch operation interface 12.

When causing the display 11 to display the operator's operation hand in overlap, the controller 14 performs image processing on the aforementioned image to extract a portion or all of the operator's operation hand. In other words, the controller 14 removes image information such as the background outside the outline of the operator's operation hand. If the touchpad 121 is surrounded by a black border, the controller 14 can extract the operator's operation hand easily on the basis of the captured image.

The controller 14 may optionally perform image processing to color the operation hand portion when the captured image is black and white. To make the operator's operation hand displayed on the display 11 more realistic, the controller 14 preferably performs the image processing to color the operation hand portion.

When the captured image is a color image, the controller 14 preferably causes the operator's operation hand to be displayed in overlap on the screen without changing the actual color and brightness of the operation hand. This example is not limiting, and to make the display content behind the operation hand more visible, the controller 14 may perform image processing to remove color, brightness, and the like and to paint the operation hand portion a predetermined single color instead, for example. The controller 14 may perform image processing to remove color, brightness, and the like from the operation hand portion for the operation hand portion to be completely colorless and transparent. In this case, the controller 14 causes only a portion near the outline of the operation hand to be displayed on the screen.

The image captured by the imaging unit 13 is described below as being a color image, and the controller 14 is described as causing the operator's operation hand to be displayed in overlap on the screen without changing the actual color and brightness of the operation hand. In other words, the controller 14 is described as not needing to perform image processing related to color, brightness, and the like.

The controller 14 determines the display magnification of the operator's operation hand on the basis of the size ratio between the predetermined region R1 of the touch operation interface 12 in the captured image and the operation region R2 on the screen of the display 11. For example, consider the case of the predetermined region R1 of the touch operation interface 12 being a rectangular region encompassing a portion or all of the touchpad 121, and the operation region R2 on the screen being a rectangular region encompassing a portion or all of the screen. In this case, the controller 14 calculates the ratios between the lengths of the sides of the predetermined region R1 of the touch operation interface 12 and the lengths of the corresponding sides of the operation region R2 on the screen. On the basis of these ratios, the controller 14 determines the display magnification of the operator's operation hand to be displayed in overlap by the display 11.

On the basis of the determined display magnification, the controller 14 causes the display 11 to display the captured operator's operation hand in overlap at the captured size or after enlargement or reduction.

The controller 14 may use the same display magnification for the operator's operation hand as the aforementioned ratios or use a different value based on the aforementioned ratios. The processing to determine the display magnification may, for example, be executed simultaneously with the above-described calibration when the in-vehicle information processing system 10 is initially installed in the vehicle or executed at any other time. The controller 14 may fix the display magnification once the display magnification has been determined or may vary the display magnification in accordance with circumstances. For example, the controller 14 may use different display magnifications for the operator's operation hand during the day and at night or may change the display magnification to an operator set value.

When the display 11 includes a plurality of screens, for example, the controller 14 may change the display magnification of the operator's operation hand to be displayed in overlap on the basis of the size of the operation region R2 of each screen. This configuration is not limiting, and the controller 14 may derive an average, for example, of the size of the operation region R2 of each screen and use a constant display magnification, based on the average, for the operator's operation hand to be displayed in overlap.

The controller 14 may change the display magnification of the operator's operation hand in accordance not only with the size of the operation region R2 on the screen, but also with the content to be displayed on the screen. For example, when the operator operates a map, functional items, or the like displayed on the display 11, the controller 14 may cause the display to display the operation hand in overlap using a lower display magnification for the operation hand than usual to facilitate operation by the operator.

The controller 14 may, for example, change the display magnification for each operator so that the operation hand displayed in overlap by the display 11 is a uniform size between operators with different hand sizes. Alternatively, the controller 14 may set the display magnification of the operation hand displayed in overlap by the display 11 to be constant between operators with different hand sizes so that the operator's operation hand is displayed in overlap in accordance with the actual hand size.

The controller 14 preferably performs image processing within a predetermined length of time on the image captured by the imaging unit 13. The predetermined length of time refers to the time lag between the timing of actual operation by the operator's operation hand and the timing of movement of the operator's operation hand displayed in overlap on the screen, i.e. a time lag short enough not be recognized by the operator. In other words, the controller 14 preferably completes the image processing within a length of time sufficiently shorter than the time lag, based on the operator's reaction speed and cognitive ability, after which the operator feels that operations are unnatural. For example, the controller 14 preferably limits the image processing to the above-described extraction of the operator's operation hand from the captured image and adjustment of the display magnification.

In other words, the position coordinates in the predetermined region R1 of the touch operation interface 12 at which a touch operation by the operator's operation hand is detected are preferably identified not by image processing of the image captured by the imaging unit 13, but rather on the basis of detection information from the touch operation interface 12, in particular the touchpad 121, as described above.

The controller 14 has been described as performing two types of image processing, but instead the controller 14 may perform three or more types of image processing, provided that the image processing terminates within a predetermined length of time. In this case, the position coordinates in the predetermined region R1 of the touch operation interface 12 at which a touch operation by the operator's operation hand is detected may, for example, be identified by image processing of the image captured by the imaging unit 13.

To perform the aforementioned image processing, the controller 14 refers to information, from the memory 15, related to the predetermined region R1 of the touch operation interface 12 and the operation region R2 on the screen of the display 11. Specifically, the controller 14 refers to information related to the position coordinates, in the predetermined region R1 of the touchpad 121, associated with the detection information. The controller 14 refers to information related to the position coordinates in the operation region R2 of each screen of the display 11. The controller 14 refers to information related to the display magnification, determined by calibration or the like, of the operator's operation hand to be displayed in overlap.

An example of operations that the operator performs using the in-vehicle information processing system 10 is described with reference to FIGS. 7A and 7B and FIGS. 8A and 8B.

Figure 7A:
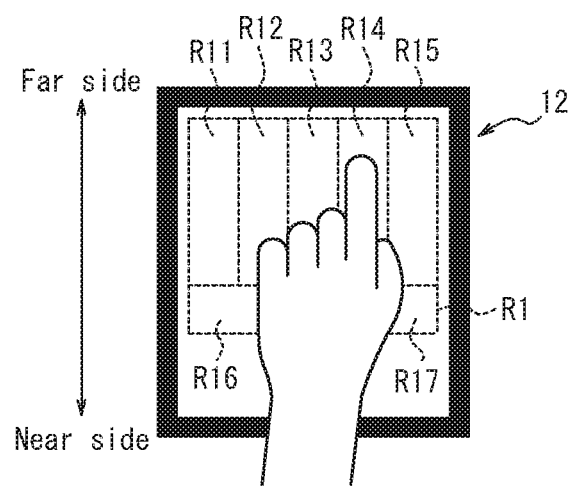
FIGS. 7A and 7B schematically illustrate an example of the correspondence relationship between functional items displayed on a screen of the display and a touchpad.
Figure 7B:
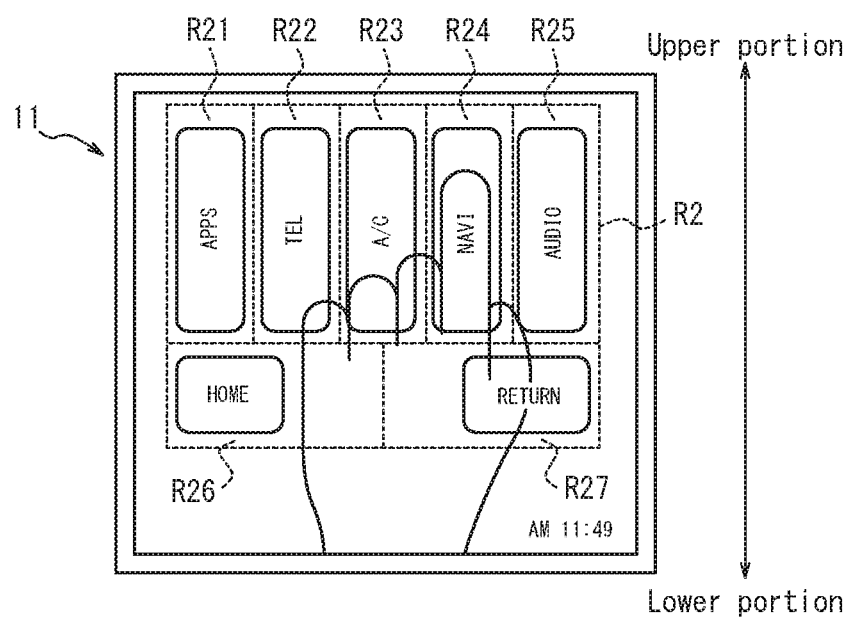

FIGS. 7A and 7B schematically illustrate an example of the correspondence relationship between functional items, displayed on a screen of the display 11, and the touchpad 121. The controller 14 determines at least one area within the operation region R2 on the screen and causes at least one functional item, for the operator to control information related to the vehicle, to be displayed on the screen in association with each area. For example, the controller 14 divides the operation region R2 set at the upper portion of the screen into seven areas: R21, R22, R23, R24, R25, R26, and R27, and displays the functional items "APPS", "TEL", "A/C", "NAVI", "AUDIO", "HOME", and "RETURN" in correspondence with the areas. The seven areas R21 to R27 correspond to seven areas R11, R12, R13, R14, R15, R16, and R17 in the predetermined region R1 of the touch operation interface 12.

The number of areas designated by controller 14 is not limited to seven and may be any number one or greater. The functional items displayed in the areas are not limited to the above examples and may be any items for controlling information related to the vehicle. The method of displaying each functional item is not limited to the display of characters in FIG. 7B. Any display method visible to the operator may be used, such as display of an arrow or other icon.

The operator performs a touch operation on the area R14, for example, to active the car navigation. When the touchpad 121 detects contact by a portion of the operator's operation hand on the area R14, the controller 14 causes the item "NAVI" displayed in the area R24 to be highlighted. At this time, the controller 14 displays the operator's operation hand in overlap at the corresponding position on the basis of the image captured by the imaging unit 13.

The controller 14 finalizes selection of the item "NAVI" displayed in the area R24 when the tact switch 122 turns on in response to the touchpad 121 being pushed by a portion of the operator's operation hand. In accordance with a push by a portion of the operator's operation hand in contact with the area R14, such as the index finger, the controller 14 causes a similar movement to be displayed on the screen at this time.

The controller 14 performs processing related to "APPS" displayed in the area R21 when the operator performs a touch operation on the area R11. The controller 14 performs processing related to "TEL" displayed in the area R22 when the operator performs a touch operation on the area R12. The controller 14 performs processing related to "A/C" displayed in the area R23 when the operator performs a touch operation on the area R13. The controller 14 performs processing related to "AUDIO" displayed in the area R25 when the operator performs a touch operation on the area R15. The controller 14 performs processing related to "HOME" displayed in the area R26 when the operator performs a touch operation on the area R16. The controller 14 performs processing related to "RETURN" displayed in the area R27 when the operator performs a touch operation on the area R17.

Figure 8A:
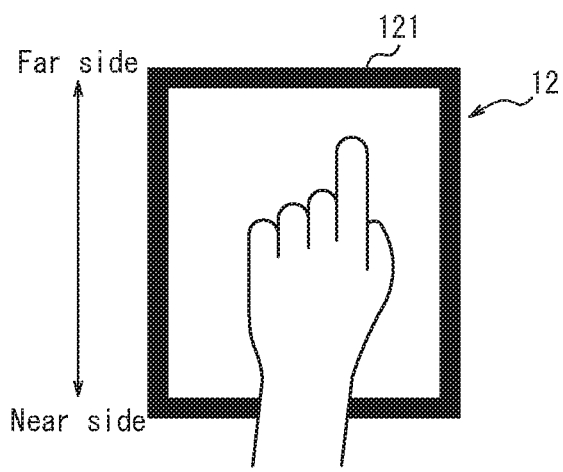
FIGS. 8A and 8B are schematic diagrams illustrating an example of operations virtually performed by the operator's operation hand displayed in overlap on the screen.
Figure 8B:
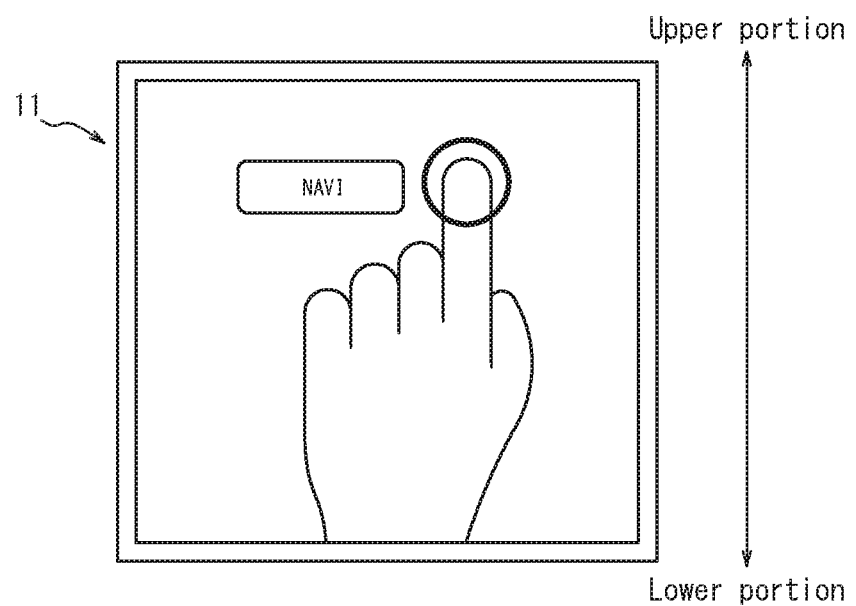

The controller 14 has been described as causing functional items to be displayed in association with designated areas within the operation region R2 in FIGS. 7A and 7B, but this example is not limiting. As illustrated in FIGS. 8A and 8B, the controller 14 may allocate functions to portions of the operator's operation hand and selectively execute functions on the screen on the basis of operations by the portions on the touch operation interface 12. In this case, the controller 14 does not need to display functional items in different areas in order to selectively execute functions.

FIG. 8A and FIG. 8B are schematic diagrams illustrating an example of operations virtually performed by the operator's operation hand displayed in overlap on the screen. Instead of causing functional items to be displayed on the screen, the controller 14 allocates functional items to portions of the operator's operation hand, for example to each of three fingers. In greater detail, the controller 14 allocates the functions "RETURN", "NAVI", and "HOME" to the thumb, index finger, and middle finger of the operator's operation hand. The fingers to which functions are allocated are not limited to the above example. Any functions may be allocated to any total number of any of the fingers.

For example, when the operator contacts the touchpad 121 with the index finger, the controller 14 acquires a detection signal related to the contact on the touchpad 121 from the touch operation interface 12. At this time, the controller 14 identifies which finger is in contact with the touchpad 121 on the basis of the captured image acquired from the imaging unit 13. In other words, the controller 14 identifies the position coordinates of contact on the touchpad 121 on the basis of detection information acquired from the touch operation interface 12 and identifies which finger is in contact on the basis of image information acquired from the imaging unit 13.

The controller 14 may display any signal on the screen when identifying contact by the operator's operation hand. The controller 14 does not display the signal on the screen when not identifying contact by the operator's operation hand. For example, when identifying contact, the controller 14 may cause the item "NAVI" to be displayed by characters or a predetermined icon near the operator's index finger displayed in overlap on the screen. The controller 14 may also cause the displayed item to be highlighted. To indicate to the operator, in the form of visual information, that contact by the operator's index finger has been identified, the controller 14 may cause the index finger to be displayed with a circular pointer or the like around the index finger. In this way, the operator can easily recognize which finger is in contact with the touchpad 121 in the form of visual information.

The controller 14 finalizes selection of the item "NAVI" displayed near the operator's index finger when the tact switch 122 turns on in response to the touchpad 121 being pushed by the operator. In accordance with a push by the operator's index finger that is in contact at the corresponding position on the touchpad 121, the controller 14 causes a similar movement to be displayed on the screen at this time.

The controller 14 performs processing related to "RETURN" when the operator performs a touch operation with the thumb. The controller 14 performs processing related to "HOME" when the operator performs a touch operation with the middle finger.

For example, when the operator contacts the touchpad 121 with the thumb, index finger, and middle finger simultaneously, the controller 14 may cause all of the above items to be displayed on the screen simultaneously. In other words, the controller 14 may cause the items "RETURN", "NAVI", and "HOME" to be displayed simultaneously as characters or icons near the operator's thumb, index finger, and middle finger displayed in overlap on the screen. The controller 14 may also cause the displayed items to be highlighted. To indicate to the operator, in the form of visual information, that contact by the operator's fingers has been identified, the controller 14 may cause the fingers to be displayed with a circular pointer or the like around each finger. When the operator pushes the touchpad 121 with a particular finger, the controller 14 finalizes selection of the function allocated to that finger.

In the above case, the controller 14 may identify the pushing finger on the basis of image information captured by the imaging unit 13, for example. To identify the pushing finger with greater accuracy, the controller 14 may, for example, identify the pushing finger on the basis of detection signals from a plurality of tact switches 122 arranged directly below the touchpad 121. In other words, the controller 14 identifies the position coordinates and type of fingers at the point in time when the operator contacts fingers to the touchpad 121 simultaneously. Subsequently, the controller 14 identifies the pressed positions on the touchpad 121 via the tact switches 122. The controller 14 thus identifies the functions of the fingers for which selection is to be finalized.

Figure 9:
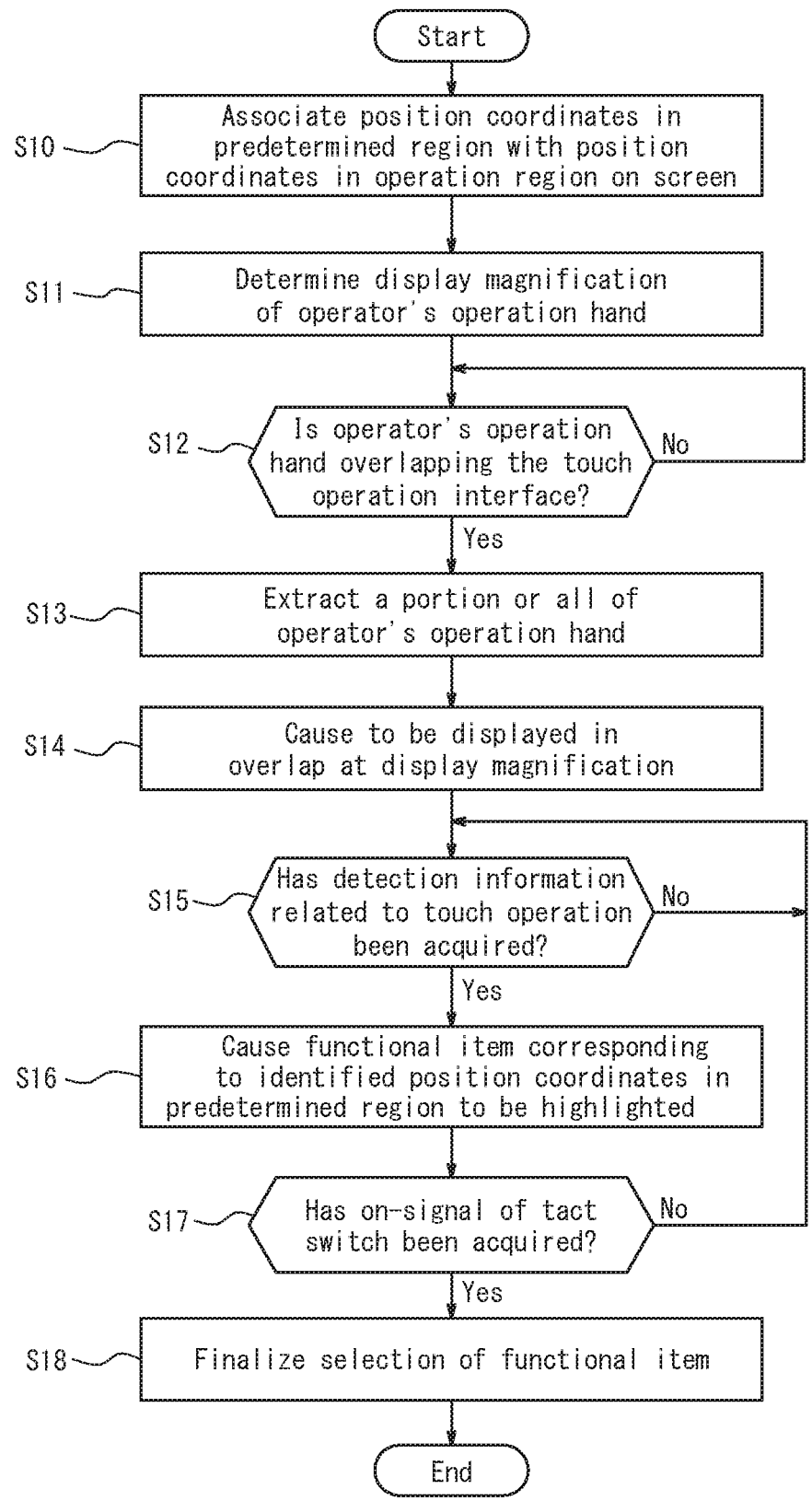
FIG. 9 is a flowchart illustrating an example of operations by the in-vehicle information processing system of FIG. 1.

FIG. 9 is a flowchart illustrating an example of operations by the in-vehicle information processing system 10.

The controller 14 performs calibration. In other words, the controller 14 associates position coordinates in the set predetermined region R1 of the touch operation interface 12 with position coordinates in the set operation region R2 on the screen of the display 11 (step S10).

By performing the calibration or the like, the controller 14 determines the display magnification of the operator's operation hand to be displayed in overlap by the display 11 (step S11).

The controller 14 judges whether the operator's operation hand is overlapping the touch operation interface 12 on the basis of an image captured by the imaging unit 13 (step S12).

The controller 14 proceeds to step S13 when the operator's operation hand is judged to be overlapping the touch operation interface 12. When the operator's operation hand is judged not to be overlapping the touch operation interface 12, the controller 14 returns to step S12 and waits for the operator's operation hand to be in overlap.

The controller 14 performs image processing to extract a portion or all of the operator's operation hand when the operator's operation hand is judged to be overlapping the touch operation interface 12 (step S13).

On the basis of the display magnification determined in step S11, the controller 14 causes the imaged operator's operation hand to be displayed in overlap (step S14).

The controller 14 judges whether detection information related to a touch operation has been acquired from the touch operation interface 12 (step S15).

When the detection information has been acquired, the controller 14 proceeds to step S16. When the detection information has not been acquired, the controller 14 returns to step S15 and waits until the detection information is acquired.

When the detection information has been acquired, the controller 14 causes the functional item corresponding to the identified position coordinates in the predetermined region R1 of the touch operation interface 12 to be highlighted (step S16).

The controller 14 judges whether a signal for the on state of the tact switch 122 has been acquired from the touch operation interface 12 (step S17).

When the signal for the on state has been acquired, the controller 14 proceeds to step S18. When the signal for the on state has not been acquired, the controller 14 returns to step S15 and judges again whether the detection information has been acquired.

When the signal for the on state has been acquired, the controller 14 finalizes selection of the functional item highlighted in step S16 (step S18).

The processing flow then terminates.

The in-vehicle information processing system 10 according to the present embodiment thus allows the operator to perform operations intuitively, since the operator's operation hand displayed on the display 11 virtually manipulates the information on the screen. In other words, the operator can access the content of the screen with a more realistic sensation. The operator can intuitively recognize the relationship between the actual position of the operation hand and the position on the screen. Consequently, the in-vehicle information processing system 10 can reduce the amount of time the operator spends staring at the screen as compared to a known apparatus that displays a pointer or the like.

By limiting the time for performing image processing, the in-vehicle information processing system 10 can cause the operator's operation hand to be displayed in overlap with a minimal time lag. In other words, the in-vehicle information processing system 10 can reduce the temporal misalignment in movement between the actual operation hand and the operation hand displayed in overlap on the screen. The operator can therefore more naturally manipulate the information displayed on the screen.

The in-vehicle information processing system 10 performs image processing to extract the operator's operation hand captured by the imaging unit 13, thereby allowing the operator's operation hand to be displayed faithfully in overlap on the screen. The operator can thereby intuitively recognize that the operation hand displayed in overlap on the screen is the operator's own hand.

The in-vehicle information processing system 10 performs image processing to change the display magnification of the operator's operation hand captured by the imaging unit 13, thereby allowing the operator's operation hand to be displayed in overlap at the optimal size for the screen. The operator can thereby perceive the operation hand displayed in overlap on the screen as being realistic while easily being able to view the display content behind the operation hand.

Unlike the case of performing image processing to identify the position coordinates within the predetermined region R1 at which a touch operation is detected, the in-vehicle information processing system 10 can display the operator's operation hand in overlap with a minimal time lag. The in-vehicle information processing system 10 does not identify the position coordinates indirectly on the basis of the image captured by the imaging unit 13 but rather directly with the touch operation interface 12. This allows the position coordinates to be identified accurately. In other words, the in-vehicle information processing system 10 uses the touch operation interface 12 to detect the position actually contacted by the operation hand, thus yielding a low chance of erroneous operation when the operator selects a functional item or the like displayed on the screen.

In the in-vehicle information processing system 10, the imaging unit 13 captures an image of all of the operator's operation hand, allowing the operator to easily recognize that the operator's own hand is displayed in overlap on the screen. The display on the screen allows the operator to easily recognize which portion of the operation hand the operator is moving. Since the operator accurately recognizes the relationship between the actual position of the operation hand and the position on the screen, the operator can easily grasp the amount of movement of the operation hand and the region on the screen in which movement is possible.

By capturing an image of all of the operator's operation hand with the imaging unit 13, the in-vehicle information processing system 10 can accurately recognize the operator's operation hand on the touchpad 121. In other words, the in-vehicle information processing system 10 can accurately recognize the operator's operation hand as a human hand. The in-vehicle information processing system 10 can more accurately identify each portion of the operator's operation hand. In other words, the in-vehicle information processing system 10 can accurately identify the finger that corresponds to a finger in the captured image. By capturing all of the operation hand, the in-vehicle information processing system 10 can accurately identify the size of the entire operation hand, the size ratio of each portion of the entire operation hand, and the like. In association with actual movement of the operation hand on the touchpad 121, the in-vehicle information processing system 10 can thus accurately identify the amount of movement of the operator's operation hand in the screen and the region on the screen in which movement is possible.

The in-vehicle information processing system 10 sets the predetermined region R1 on the far side of the touchpad 121 and sets the operation region R2 in the upper portion of the screen, thereby inevitably causing the operator to overlay the operation hand on the entire touch operation interface 12. At this time, the in-vehicle information processing system 10 can inevitably capture an image of all of the operator's operation hand with the imaging unit 13. As a result of the regions on the touchpad 121 other than the predetermined region R1 being configured not to respond to touch operations, the operator focuses more on the predetermined region R1. At this time, the in-vehicle information processing system 10 can more reliably capture an image of all of the operator's operation hand.

Since the in-vehicle information processing system 10 displays functional items in association with designated areas within the operation region R2, the operator can easily view the functional item that the operator wishes to select. In other words, the operator can intuitively recognize the area on the touch operation interface 12 in which to perform a touch operation when selecting a predetermined functional item.

On the other hand, when the in-vehicle information processing system 10 allocates functions to portions of the operator's operation hand, each function can be selected at any location on the screen. In other words, the in-vehicle information processing system 10 can minimize the operation range for touch operation by the operator. Consequently, the operator can easily perform touch operations.

The in-vehicle information processing system 10 can allow the user to clearly recognize, in the form of visual information, which finger is in contact with the touchpad 121 by highlighting the item that the operator selected by contact. The operator can easily see which position on the screen is contacted by the operation hand displayed in overlap or which item is selected.

The in-vehicle information processing system 10 provides the operator with a click sensation when the tact switch 122 turns on. The operator can therefore obtain tactile feedback on his own operation and can perform more intuitive operations. In other words, use of the tact switch 122 to finalize selection allows the operator to finalize the selected item with a natural operation. Additionally, the operator perceives the operation hand displayed in overlap on the screen as being more realistic due to the reactive force on the finger. The operator is thus more easily tricked into perceiving that the operation hand is actually in direct contact with the screen.

The in-vehicle information processing system 10 can ensure realism by making the operator's operation hand displayed in overlap translucent. The information displayed on the screen is therefore more visible to the operator. Consequently, the operator can more intuitively manipulate the information displayed on the screen.

The in-vehicle information processing system 10 can more easily capture an image of all of the operator's operation hand by the imaging unit 13 being installed above the touch operation interface 12.

It will be apparent to a person of ordinary skill in the art that the present disclosure can be embodied in forms other than the above embodiment without departing from the spirit or essential features of the present disclosure. Accordingly, the description above is only a non-limiting example. The scope of the present disclosure is defined not by the description above, but by the appended claims. Among all possible modifications, the modifications within the range of equivalents are to be considered encompassed by the claims.

REFERENCE SIGNS LIST

10 In-vehicle information processing system
11 Display
12 Touch operation interface
121 Touchpad
122 Tact switch
13 Imaging unit
14 Controller
15 Memory R1 Predetermined region
R11, R12, R13, R14, R15, R16, R17 Area
R2 Operation region
R21, R22, R23, R24, R25, R26, R27 Area
R3 Region

The invention claimed is:

1. An in-vehicle information processing system comprising:
a display comprising at least one screen and configured to display a functional item on the screen;
a touch operation interface configured to detect contact by an operation hand of an operator; and
a controller configured to associate position coordinates in an operation region on the screen with position coordinates in a predetermined region of the touch operation interface and to cause at least a portion of the operation hand to be displayed in overlap on the screen; wherein
a transmittance of the operation hand displayed in overlap at a position where the functional item is displayed is more transparent than the transmittance of the operation hand displayed in overlap at a position of a background excluding the functional item.

2. The in-vehicle information processing system of claim 1, comprising an imaging unit configured to capture an image of the touch operation interface and at least a portion of the operation hand, wherein the imaging unit is configured to capture an image of all of the operation hand.

3. The in-vehicle information processing system of claim 1, wherein
the predetermined region of the touch operation interface is set at a far side of the touch operation interface; and
the operation region on the screen is set at an upper portion of the screen in correspondence with setting of the predetermined region.

4. The in-vehicle information processing system of claim 1, wherein the controller is configured to determine at least one area within the operation region on the screen and to cause at least one item for controlling information related to a vehicle to be displayed on the screen in association with the area.

5. The in-vehicle information processing system of claim 1, wherein the controller is configured to allocate functions to portions of the operation hand and to selectively execute the functions on the screen on the basis of operations by the portions on the touch operation interface.

6. The in-vehicle information processing system of claim 1, wherein the transmittance increases with increased proximity to a fingertip of the operation hand.

7. An in-vehicle information processing system comprising:
a display comprising at least one screen and configured to display a functional item on the screen;
a touch operation interface configured to detect contact by an operation hand of an operator;
an imaging unit configured to capture an image of the touch operation interface and at least a portion of the operation hand; and
a controller configured to associate position coordinates in an operation region on the screen with position coordinates in a predetermined region of the touch operation interface and to cause at least a portion of the operation hand to be displayed in overlap on the screen on the basis of the image captured by the imaging unit; wherein
a transmittance of the operation hand displayed in overlap at a position where the functional item is displayed is more transparent than the transmittance of the operation hand displayed in overlap at a position of a background excluding the functional item.

8. The in-vehicle information processing system of claim 1, wherein
a first part of the operation hand displayed in overlap at the position where the functional item is displayed is more transparent than a second part of the operation hand displayed in overlap at the position of the background excluding the functional item.

9. The in-vehicle information processing system of claim 7, wherein
a first part of the operation hand displayed in overlap at the position where the functional item is displayed is more transparent than a second part of the operation hand displayed in overlap at the position of the background excluding the functional item.

* * * * *